United States Patent
Jordan et al.

(10) Patent No.: US 6,529,449 B1
(45) Date of Patent: Mar. 4, 2003

(54) MAGNETO-OPTICAL HEAD INVOLVING SOLID IMMERSION LENS WITH TWO-LAYER HEAT-DISPERSIVE COIL

(75) Inventors: Stephen G. Jordan, Fremont, CA (US); Robert Gray, Fremont, CA (US); Arun Malhotra, San Jose, CA (US)

(73) Assignee: Aiwa Co. Ltd., Tokyo (JP)

( * ) Notice: Subject to any disclaimer, the term of this patent is extended or adjusted under 35 U.S.C. 154(b) by 148 days.

(21) Appl. No.: 09/625,368

(22) Filed: Jul. 26, 2000

(51) Int. Cl.$^7$ .............................................. G11B 11/00
(52) U.S. Cl. ................................. 369/13.33; 369/13.13
(58) Field of Search ..................... 369/13.13, 13.33, 369/13.17, 13.32, 112.01, 112.08, 112.23, 44.14

(56) References Cited

U.S. PATENT DOCUMENTS

| | | | | |
|---|---|---|---|---|
| 6,055,222 A | * | 4/2000 | Knight | 369/112 |
| 6,069,853 A | * | 5/2000 | Novotny et al. | 369/13.13 |
| 6,130,864 A | * | 10/2000 | Burroughs | 369/13.13 |
| 6,307,832 B1 | * | 10/2001 | Novotny et al. | 369/13.13 |
| 6,351,436 B1 | * | 2/2002 | Mallary | 369/13.13 |
| 6,377,535 B1 | * | 4/2002 | Chen et al. | 369/13.13 |
| 6,396,783 B1 | * | 5/2002 | Bell, Jr. et al. | 369/53.18 |

\* cited by examiner

*Primary Examiner*—Tan Dinh
(74) *Attorney, Agent, or Firm*—Oblon, Spivak, McClelland, Maier & Neustadt, P.C.

(57) ABSTRACT

A magneto-optical head with a centrally-located solid immersion lens and a coil formed radially about the lens advantageously utilizes an insulating material with a relatively high thermal conductivity for isolating the coil and avoiding heat damage to the head when current is passed through the head during a write operation. First and second coils in first and second coil layers are coupled by a via to form a continuous coil. A combination of a chemical-mechanical contouring operation and the lack of any intervening low thermal conductivity material adjacent the coil effectively produces an insulation layer that is thin but has a contour with a very smooth surface, resulting in a highly compact multiple-level coil.

10 Claims, 5 Drawing Sheets

MAGNETO-OPTICAL HEAD INVOLVING SOLID IMMERSION LENS WITH TWO-LAYER HEAT-DISPERSIVE COIL

BACKGROUND OF THE INVENTION

Near-field recording techniques have been developed that advantageously attain the storage capacity of high-end tape drives and libraries with the seek time and transfer rate performance and costs comparable to mid-range hard-disk drives. Near-field recording systems combine technology of several fields including magnetic recording, optical recording, magneto-optical (M-O) systems, consumer electronics, and microscopy to attain improvements in areal density, capacity, performance, and cost.

One technology that is highly useful for storing large quantities of data is optical data mass storage in which data is accessed by focusing a laser beam onto a data surface of the disc and detecting light reflected from or transmitted through the data surface. For a typical optical mass storage disk, stored data is arranged in tracks arranged on a reflective surface of the disk. To read the data from a selected track, optics in an optical disk drive generate a beam of light, for example a laser beam, and direct the beam toward the selected track where the beam is reflected. Data stored on the disk is reconstructed during a read operation by monitoring the beam after reflection. Read and write optics generally include a moveable mirror or lens to precisely guide the beam to the selected track, and an objective lens located near the reflective surface to focus the beam upon the surface.

A near-field recording head operates as a flying head that is positioned a "near-field" distance from a recording media of less than the wave-length of the interrogating laser light. One type of recording component is a solid immersion lens (SIL) which is used to focus a laser beam to a fine spot. To write to an optical media, energy from the fine spot is transferred or coupled onto a surface of a disk medium in an effect called "evanscent coupling". The near-field recording head uses a tiny magnetic coil that writes information to the heated spot on the disk. Ultra-small bit domains are written to overlapping sequences, creating a series of bit domains that are generally in the shape of a crescent. Usage of crescent-shaped bit domain recording effectively doubles the bit density, increasing overall areal density.

During a write operation, laser energy that is transferred by the flying head to the media heats a spot on the recording surface to a Curie point of about 300° C. in roughly one nanosecond. A magnetic field is pulsed into the heated spot by a planar coil embedded within the head substrate. The planar coil is generally a flat coil that rests in a plane parallel to the plane of the flying head surface. The planar coil is very small and light-weight and typically is formed within the flying head assembly, rather than exposed on the underside surface of the head.

One problem with magneto-optical (M-O) systems is that the magnetic media is highly durable, requiring extensive heating to create the recorded series of crescent-shaped bit domains. The extensive heating of the media in close proximity to the recording head causes condensation of the media material on the lens of the recording head, clouding the lens so that read and write utility of the lens is obstructed.

What is needed is an apparatus and operating method for avoiding condensation on the lens of a magneto-optical recording system. What is further needed is a fabrication method for constructing a magneto-optical recording head that avoids condensation on the lens.

SUMMARY

It has been discovered that a magneto-optical head with a centrally-located solid immersion lens and a coil formed radially about the lens advantageously utilizes an insulating material with a relatively high thermal conductivity for isolating the coil. The high thermal conductivity of the insulating material avoids heat damage to the head when current is passed through the head during a write operation.

It has further been discovered that a magneto-optical head with a centrally-located solid immersion lens and a coil formed radially about the lens is advantageously fabricated using a chemical-mechanical contouring operation for contouring an insulating material with a relatively high thermal conductivity for isolating the coil with no intervening material having a relatively low thermal conductivity separating the high thermal conductivity insulating layer and the coil. The combination of the chemical-mechanical contouring operation and the lack of a low thermal conductivity material effectively produce an insulating layer that is thin but has a contour with a very smooth surface, effectively producing a highly compact multiple-level coil.

In accordance with one aspect of the present invention, a magneto-optical head includes a substrate perforated by a hole, a mesa formed within the hole in the substrate of a material having a high refractory index, and a first coil arranged on the substrate in a first coil layer. The first coil is coiled around the mesa at an increasing radius about the mesa. The magneto-optical head further includes a first high thermal conductivity insulating layer deposited over the substrate around, between, and overlying the first coil with no intervening material having a relatively low thermal conductivity separating the first high thermal conductivity insulating layer and the first coil, the first high thermal conductivity insulating layer having a planar surface. The magneto-optical head has multiple coil layers and thus includes a second coil arranged on the first high thermal conductivity insulating layer in a second coil layer. The second coil is also coiled around the mesa at an increasing radius about the mesa. A second high thermal conductivity insulating layer is deposited over the first high thermal conductivity insulating layer around, between, and overlying the second coil with no intervening material having a relatively low thermal conductivity separating the second high thermal conductivity insulating layer and the second coil. The second high thermal conductivity insulating layer has a planar surface. A via passes through the first high thermal conductivity insulating layer and couples the first coil and the second coil to form a continuous coil in the first and second coil layers.

In some implementations, the magneto-optical head further includes a conductive heating element layer coupled encircling and adhered to lateral sides of the mesa, and having lead appendages extending from the lateral sides of the mesa overlying the substrate and underlying the first coil layer. The magneto-optical heads with the conductive heating element may include an insulative layer coupled between the conductive heating element layer and the first coil layer.

In accordance with another aspect of the present invention, a method of fabricating a magneto-optical head includes supplying a substrate wafer, drilling a hole in the substrate, positioning a sphere of a material having a high refractory index within the hole, machining the substrate and sphere combination to convert the sphere into a mesa, depositing a conductive layer overlying the substrate, and etching the conductive layer to form a coil coiled around the mesa at an increasing radius about the mesa. The method further includes depositing a high thermal conductivity insulating layer over the substrate around, between, and overlying the coil with no intervening material having a relatively low thermal conductivity separating the high thermal conductivity insulating layer and the coil, and chemical-mechanically contouring the high thermal conductivity insulating layer to form a planar surface.

For some implementations of the magneto-optical heads, the method also includes fabricating a finished thin film substrate including a plurality of magneto-optical heads; wherein the operation of chemical-mechanically contouring the high thermal conductivity insulating layer forms a substantially smooth, curved surface overlying ones of the plurality of magneto-optical heads.

For some implementations of the magneto-optical heads, the method further includes depositing a conductive heating element layer directly over the mesa and the substrate, etching the conductive heating element layer to form a conductive heating element coupled encircling and adhered to lateral sides of the mesa, and having lead appendages extending from the lateral sides of the mesa overlying the substrate and underlying the first coil layer, and forming an insulative layer coupled between the conductive heating element layer and the first coil layer, the insulative layer having a thermal conductivity substantially lower than the thermal conductivity of the material forming the first, second, and at least one additional high thermal conductivity insulating layers.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE ILLUSTRATIVE EMBODIMENTS

Figure 1:
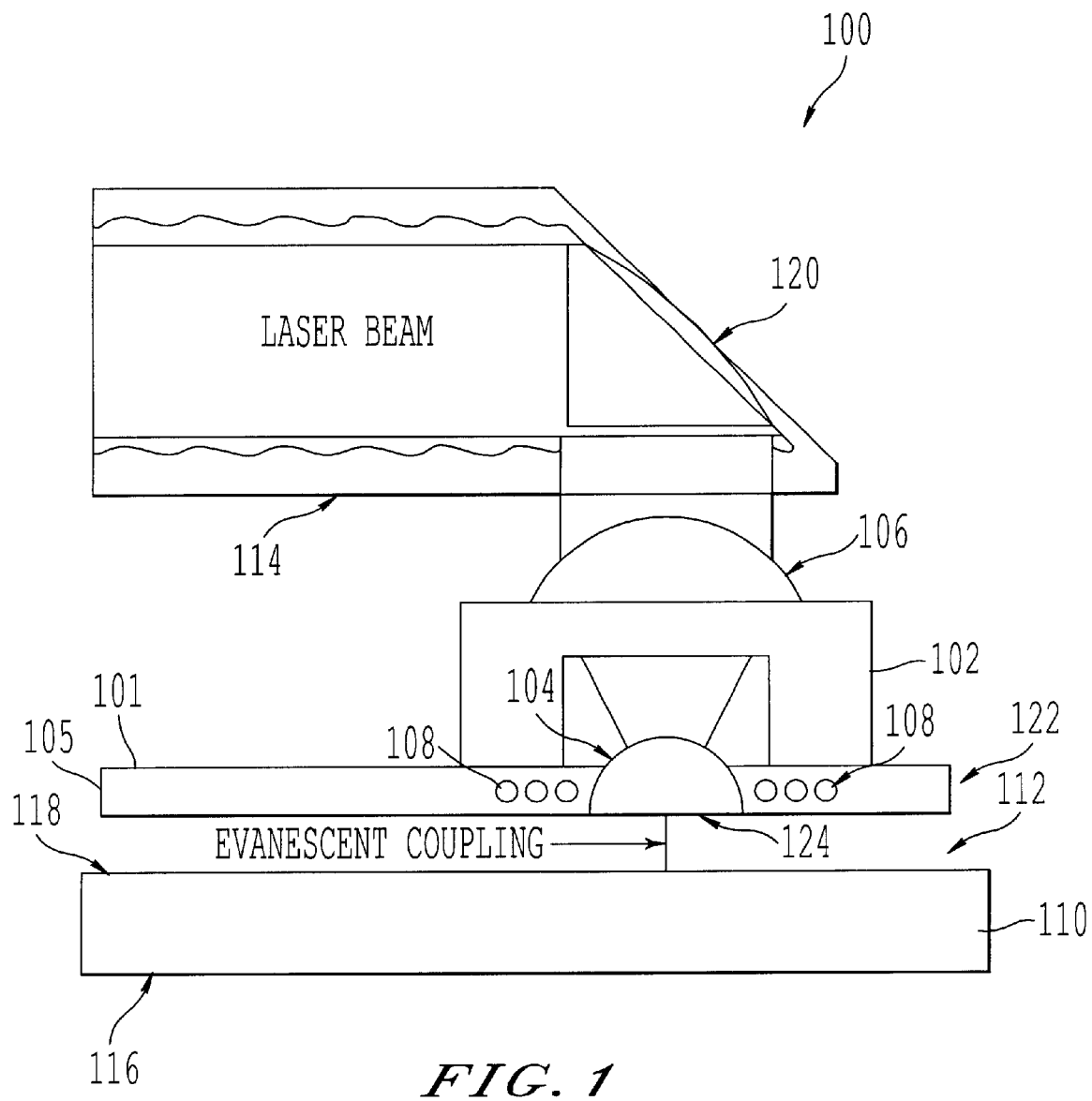
FIG. 1 is a pictorial cross sectional view showing a near-field magneto-optical recording system that is suitable for usage with a magneto-optical flying head and solid immersion lens in accordance with an embodiment of the present invention.

Referring to FIG. 1, a pictorial cross-sectional view shows a near-field magneto-optical recording system 100 including a slider 101, for example a disk-type slider or Winchester slider, that is suitable for usage with a magneto-optical flying head 102, and solid immersion lens 104. The magneto-optical flying head 102 includes a support framework 105 for mounting an objective lens 106, the solid immersion lens 104, and a magnetic coil 108. The magneto-optical flying head 102 has an aerodynamic design that positions the head 102 across an air gap 112 in close proximity to a recording media such as a plastic substrate media 110.

The distance between the solid immersion lens 104 and the substrate media 110 is controlled to a prescribed narrow width, generally to less than a selected wavelength, so that the resolution of the laser light spot within the solid immersion lens 104 is maintained across the air gap 112. The near-field magneto-optical recording system 100 utilizes the magneto-optical flying head 102 with stylus 114 to record write or read data to the substrate media 110. Typically the substrate media 110 includes a magneto-optical film layer 116 deposited on a top surface with a silicon nitride layer 118 deposited on the top of the magnetic film layer 116 for protection and to improve the magnetic field distribution of the substrate media 110. In some cases, the magneto-optical film 116 has a silicon nitride backing (not shown).

The near-field magneto-optical recording system 100 includes the objective lens 106 which focuses a laser beam 118 into the stylus 114 carried by the magneto-optical flying head 102 that reads and writes the substrate media 110. The objective lens 106 is typically a molded glass element with a spheric upper surface that receives the laser beam 118 and a lower curved convex surface through which the laser beam 118, after focusing, exits. The focused laser beam passes through the solid immersion lens 104.

The solid immersion lens 104 is typically a ground glass element with an upper spherical surface and a bottom flat surface. The centers of curvature of the upper and lower surfaces for both the objective lens 106 and the solid immersion lens 104 are aligned with the laser beam 118. The glass for both the objective lens 106 and the solid immersion lens 104 generally have a high refractive index, for example in a range from about 1.5 to approximately 3. Typically, the objective lens 106 and the solid immersion lens 104 are manufactured from the same transparent material and have the same index of refraction. In some systems, the objective lens and solid immersion lens may be produced from different materials, although a result may be an increase in focused spot size.

In some near-field magneto-optical recording systems 100, the magneto-optical flying head 102 is mounted on an air-bearing slider (not shown) that accurately controls the flying height so that no servo-control system is employed to maintain focus between the magneto-optical flying head 102 and the substrate media 110.

Laser energy from the laser beam 118 is reflected by a folding mirror 120 through the objective lens 106 and solid immersion lens 104 to heat a spot on the recording surface of the substrate media 110 to the Curie point of the medium in approximately one nanosecond. The folding mirror 120 precisely guides the beam to the objective lens 106. The magnetic coil 108 pulses a magnetic field, either positive or negative, onto the heated spot on the substrate media 110. The magnetic coil 108 is embedded into the support framework 105 in a head substrate 122. The magnetic coil 108 is a magnetic planar or flat coil that is used to read, write, or both read and write the substrate media 110. Generally, the magnetic coil 108 is a flat coil that is arranged in the plane of the magneto-optical flying head 102 surface. In various embodiments, the magnetic coil 108 includes a single coil layer in a single plane, two coil layers in two planes, or a multiplicity of coil layers in a corresponding multiplicity of planes that are approximately parallel with the surface of the magneto-optical flying head 102. The coil is small and light-weight and is positioned in the interior of the head substrate 122, rather than on the surface of the magneto-optical flying head 102 adjacent to the air gap 112.

The near-field magneto-optical recording system 100 stores data using a combination of magnetic fields and laser energy to produce magnetic domains, called bit cells, on a recording surface. Near-field recording is used to reduce the size of a spot produced by the laser beam so that bit cells are reduced in size and bit-cell and areal density is increased.

The solid immersion lens 104 is a solid lens having the shape of a mesa 126 that approximates the shape of a partial sphere. The solid immersion lens 104 is positioned between the objective lens 106 and the writing surface of the substrate media 110 to focus incident rays of the laser beam 118 from the objective lens 106 to a single spot at the base of the mesa 126. The resulting spot is approximately half the size of a spot produced using only an objective lens.

The solid immersion lens 104 operates by decelerating the laser beam 118 to a fraction of the normal laser speed in air, thereby reducing the wavelength and allowing a very small spot size.

Typically, the solid immersion lens 104 includes a coating (not shown) of the air bearing surface 124. The coating forms a smooth, low surface energy, hard coating that reduces friction with the substrate media 110 and avoids accumulation of debris. In some systems the coating is selected to have approximately the same index of refraction as other parts of the optical path, including the objective lens 106 and the solid immersion lens 104. Suitable coating materials include silicon nitride, diamond, diamond-like-carbon (DLC) and the like.

Alternatively, another suitable coating is nontransparent with a central aperture in the optical path but otherwise being uniformly distributed on the air bearing surface of the magneto-optical flying head 102. In such systems, the aperture functions as a spatial filter to further reduce spot size and increase recording density.

The magnetic coil 108 functions in conjunction with the laser beam 118 to read and write the substrate media 110. For example, a data write operation involves application of the laser beam 118 to the substrate media 110 to heat a small spot on the medium to a point above the Curie temperature of the medium while the magnetic coil 108 simultaneously writes information to the heated spot on the substrate media 110. The magnetic coil 108 is energized and the laser beam 118 energy is discontinued. The substrate media 110 cools to a temperature below the Curie temperature, leaving the substrate media 110 with the imposed magnetic orientation.

Several factors affect recording performance. For example, the recording process is efficient if the laser beam 118 and the magnetic coil 108 are rapidly activated and deactivated. Performance further depends on the size of the magnetic field generated by the magnetic coil 108. The magnetic field should be sufficiently large to magnetically orient the media in a prescribed manner. The size of the magnetic field depends on the electrical current passed through the magnetic coil 108, the number of turns in the magnetic coil 108, and the separation of the inner-most turns of the magnetic coil 108 relative to the center of the mesa 126. The activation and deactivation speed of the magnetic coil 108 is a function of the coil inductance which is primarily determined by the number of turns in the coil.

The amount of heat generated by the magnetic coil 108 during operation is a function of the square of the electrical current times the coil resistance. Heat that is generated during operation of the magnetic coil 108 must be dissipated with thermal transients and bulk heat having deleterious consequences. Thus reduction of the amount of heat generated by the magnetic coil 108 improves performance and durability of the near-field magneto-optical recording system 100. However, thermal conditions of the near-field magneto-optical recording system 100 depend not only on the heat generated by the magnetic coil 108 but also relate in a complex manner to fundamental aspects of operation of the system.

The near-field magneto-optical recording system 100 generates the laser beam 118 which impinges on the substrate media 110 to heat a spot on the media. The plastic media is highly durable so that a very high temperature is generated by the laser beam to suitably write to the media. The high temperature generated in the substrate media 110 results in formation of condensation of material on the base of the solid immersion lens 104, clouding the lens and thereby degrading the operation of the lens.

The problem of condensation on the solid immersion lens 104 is solved by exploiting the heating effect of the magnetic coil 108 that occurs during generation of the magnetic field. A sufficient current is passed through the magnetic coil 108, to evaporate the condensation that forms on the air bearing surface of the magneto-optical flying head 102. In alternative embodiments, heating of the magneto-optical flying head 102 by the magnetic coil 108 is supplemented by heat from a conductive layer (not shown) formed in the magneto-optical flying head 102 either overlying or underlying the coil. The conductive layer is typically constructed from a conductive material such as indium tin oxide. A pair of leads are connected to the conductive layer to apply an electrical current that heats the conductive layer and the magneto-optical flying head 102, assisting to evaporate the condensate. The illustrative near-field magneto-optical recording system 100 does not include the conductive layer to avoid the disadvantageous usage of additional leads at the cost of driving sufficient current through the magnetic coil 108 to clear the condensate on the magneto-optical flying head 102.

Usage of the magnetic coil 108 as a heating element creates a hazard of potentially overheating the substrate in the magneto-optical flying head 102, resulting in burn-out and failure of the magneto-optical flying head 102. Conventional heads are fabricated with an insulative material such as photoresist or silicon dioxide (oxide) separating conductive and magnetic structures within the head. Heating of the coil to a sufficient temperature to evaporate condensate on the head can evaporate the insulative photoresist or oxide layers.

Referring to FIGS. 2(A) to 2(G), several sectional views of a magneto-optical flying head illustrate steps of a process for forming the head including a mesa, substrate, and magnetic coil.

Figure 2A:
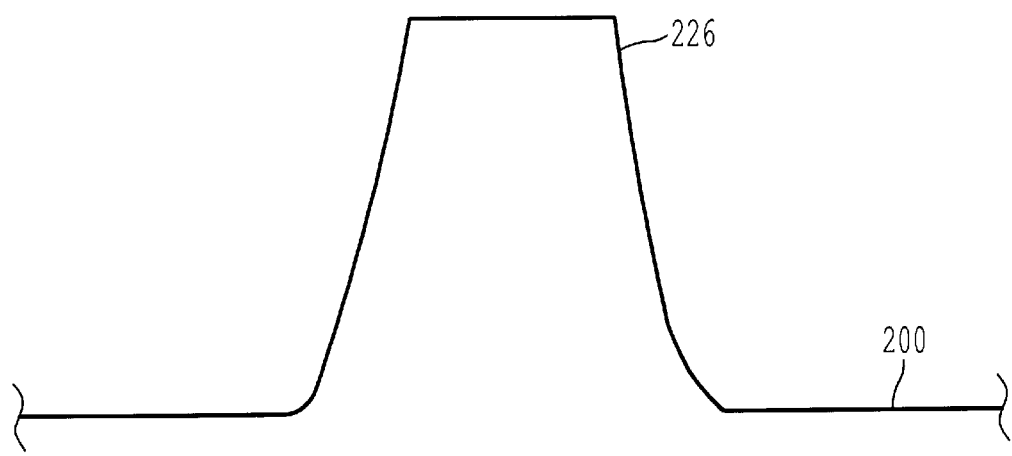
FIGS. 2(A) to 2(G) are sectional views of a magneto-optical flying head which illustrate steps of a process for forming the head including a mesa, substrate, and magnetic coil.

FIG. 2(A) depicts a substrate 200 and mesa 226 prior to fabrication of the magnetic coil 208. The mesa 226 is carried on an air bearing surface of the slider. The mesa 226 forms a portion of an optical path of the laser beam 118 from the folding mirror 120 through the magneto-optical flying head 102 to the substrate media 110. Typically focused illumination from the laser beam 118 passes approximately through the center of the mesa 226. The substrate 200 is an insulative material that is suitably heat resistant so that heating of conductive coils does not damage the head. An alumina substrate is typically used. A sheet of alumina substrate 200 having a smooth, planar structure is the foundation material for constructing a magneto-optical flying head 102. Holes are drilled into the substrate 200, typically using a laser drilling procedure. Spheres of a lens material having a high index of refraction such as glass, silicon nitride, diamond, or cubic zirconia ($ZrO_2$) are positioned into the holes in the substrate 200. The lens material typically has a high index of refraction. In an illustrative near-field magneto-optic recording system 100, the substrate 200 and cubic zirconia spheres form a composite material that is machined using a flat lapping procedure on the bottom of the substrate 200. The lapping procedure removes a portion of the cubic zirconia sphere, leaving a mesa 226 with a hemispherical shape.

Figure 2B:
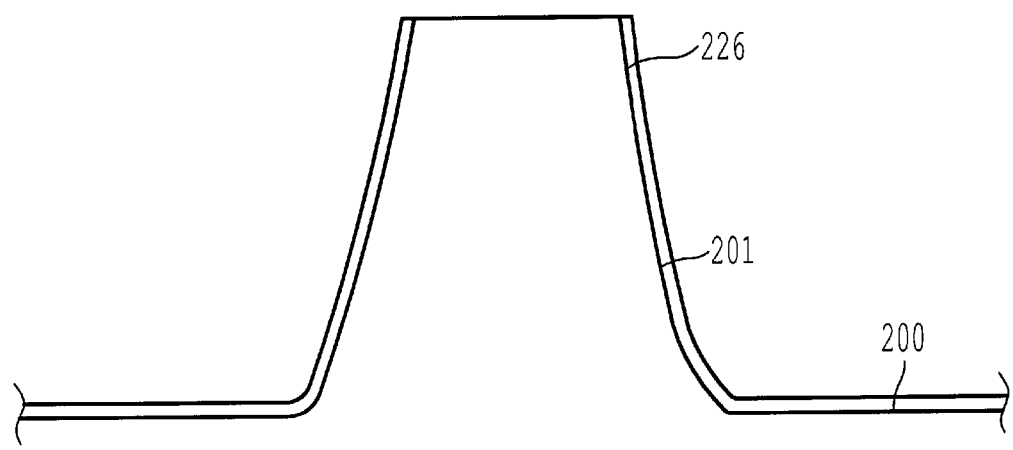

Referring to FIG. 2(B), following ion milling of the substrate 200 and mesa 226, a heating element layer such as a nickel-chromium (nichrome) layer 201 is deposited overlying the substrate 200. The nichrome layer 201 functions as a heating element for heating the mesa 226 and evaporate the media condensate that forms on the solid immersion lens 104. In the illustrative head, the nichrome layer 201 is deposited to a thickness of 3000 Å, for example. The nichrome layer 201 is patterned to uniformly cover the sloping sides of the mesa 226 and to extend over the substrate 200 in two appendages (or arms) for usage as leads 203 for connection to electrical conductors. The nichrome layer 201 is removed from top surface of the mesa 226. A current is passed through the leads 203 and the portion of the nichrome layer 201 covering the sides of the mesa 226 to heat the lens.

Figure 2C:
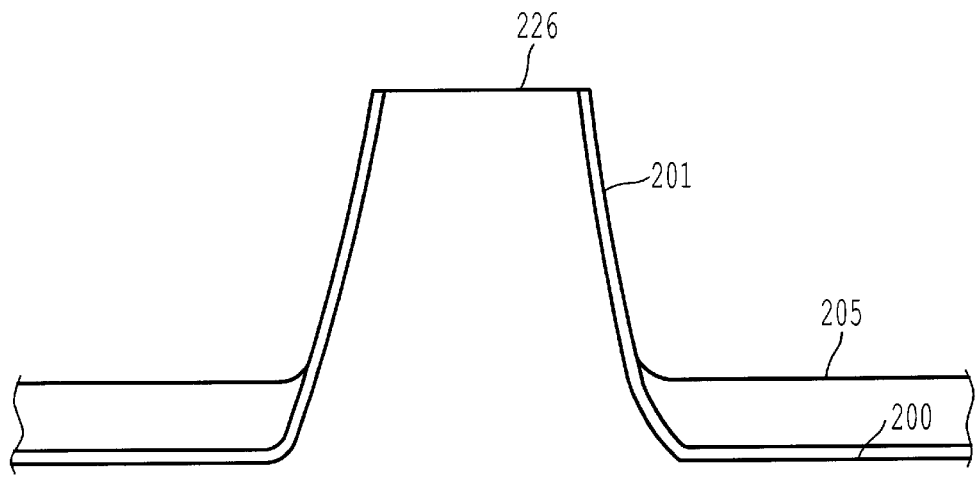

Referring to FIG. 2(C), a silicon dioxide (oxide) insulating layer 205 is deposited over the substrate 200, mesa 226, and nichrome layer 201, then patterned to remove the oxide layer 205 from the top surface and lateral sides of the mesa 226. The illustrative oxide layer 205 is deposited to a thickness of several microns and is used to insulate and thermally isolate the magnetic coil 108 from the nichrome layer 201. The low thermal conductivity of the oxide layer 205 allows the substrate 200 and the magnetic coil 108 to remain relatively cool compared to the nichrome layer 201 when current is applied to the nichrome layer 201 for heating the mesa 226 while evaporating substrate media 110 condensate. The oxide layer 205 is planarized so that subsequent layers such as the magnetic coil 108 are fabricated on a smooth, planar surface.

Figure 2D:
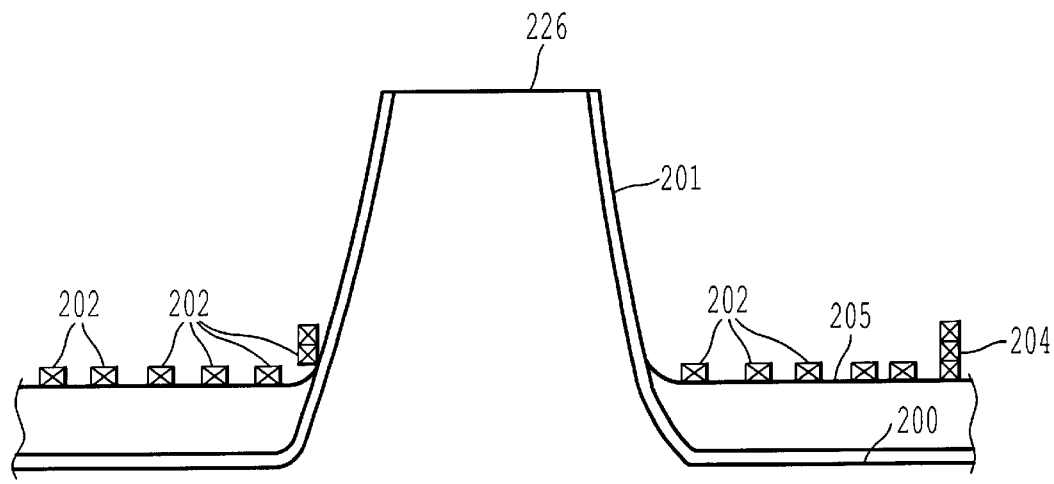

Referring to FIG. 2(D), following deposition and planarization of the oxide layer 205, a conductive layer is deposited overlying the substrate 200, nichrome heating layer 201, oxide layer 205, and mesa 226. A first layer 202, of the magnetic coil 108 is formed on the surface of the oxide layer 205 using an electroplating method. The coil is fabricated from a conductive material such as copper, gold, tantalum, and any other suitable conductive material, as is known in the magnetic transducer art.

In an illustrative near-field magneto-optic recording system 100, the electroplating procedure includes the steps of sputter-depositing a seed layer (not shown), patterning the seed layer, forming the first coil layer 202 by electroplating and chemically etching away the seed layer. Electroplating is accomplished by first sputter-depositing a plating base seed layer, for example a chrome copper film, on an upper surface of the oxide layer 205. The base seed layer depth is suitably thin, but sufficiently thick, so that conductivity for electroplating is established. The seed layer is formed, for example, by sputter depositing a layer of chrome (not shown) on the substrate surface to a depth of approximately 300 Å to 500 Å, for example. A copper layer, which forms a second tier of seed layer, is sputter deposited overlying the chrome deposition to a depth of approximately 1000 Å. The seed layer is patterned using conventional photolithographic techniques. First coil layer 202 is then formed by electroplating, using electrolysis to apply metal to the surface of the substrate surface in the regions of the surface that overlie the seed layer. After the first coil layer 202 is formed, the exposed portions of seed layer are removed by chemical etching so that elements of the first coil layer 202 sit discretely in electrical isolation upon the surface of the oxide layer 205. For a chrome copper coil, chemical etching is achieved using a chrome etchant solution of 80 gm potassium permanganate and 20 gm potassium hydroxide dissolved in 1 liter of water and a copper etchant solution of 260 gm ammonium persulfate and 190 milliliters of 30% ammonium hydroxide dissolved in 3 liters of water.

Wet etching processes are associated with the various deposition steps of the illustrative fabrication method. A wet etching process utilizes liquids, such as acids and other corrosive chemicals, as an etching agent. Etching proceeds through chemical reactions at the surface of a material. An additive electroplating fabrication process includes substantially fewer processing steps than a sputtering deposition operation which is associated with dry etching. Thus the electroplating and wet etch processes, in combination, reduce the cycle time of the fabrication process. In addition, circuits fabricated using electroplating and wet etching processes have shown an improvement in performance over devices fabricated using sputtering and dry etch processing of magnetic recording heads.

The first coil layer 202 is thus patterned, plated and chemically etched using conventional photolithographic techniques to form a fine pattern of circular lines (not shown) surrounding the mesa 226 on the surface of the oxide layer 205. The circular lines of the first layer 202 are arranged with a sequence of increasing radius from a centerpoint within the mesa 226.

After the first layer 202 of the magnetic coil 108 is formed, a via 204 is electroplated as a tap for making contact to a second layer of the ma gnetic coil 108. The magnetic coil 108 elements have sufficient size, spacing, and arrangement to create a suitable magnetic field for writing the substrate media 110, and to generate a suitable heat for evaporating condensation on the air bearing surface of the magneto-optical flying head 102. In an illustrative near-field magneto-optical recording system 100, the coils are constructed to a size of about 4 microns in width about 1 or 2 microns apart and having a height of about 5 microns. A suitable temperature is typically in the range of 150° C. to 200° C. at the surface of the lens.

The magnetic coil 108 is used to generate and orient a magnetic field for writing the substrate media 110 but the current passed through the magnetic coil 108 during writing is typically not sufficient to heat the lens enough to evaporate condensation formed by laser heating of the substrate media 110. Higher amounts of current are passed through the magnetic coil 108 to generate the higher heating that evaporates the condensation.

Figure 2E:
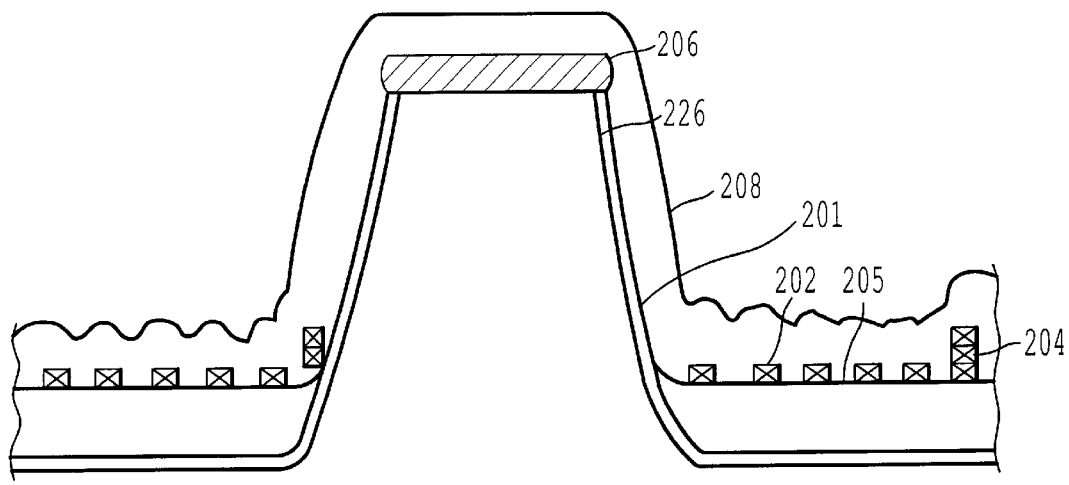

Referring to FIG. 2(E), a diamond-like carbon (DLC) protective layer 206 is deposited and patterned using conventional fabrication techniques on the top surface of the mesa 226. The DLC protective layer 206 is used as a mask to shield the mesa 226 during chemical and mechanical processing of the magneto-optical flying head 102.

Following formation of the DLC protective layer 206, an insulative layer is deposited overlaying the substrate 200, oxide layer 205, the first layer 202 of the magnetic coil 108, the mesa 226, and the DLC protective layer 206 overlying the mesa 226. The insulative layer is a heat-resistant insulative material layer such as an alumina layer 208. In the illustrative magneto-optical flying head 102, the alumina layer 208 is deposited to a sufficient thickness to leave about a 1 micron spacing between coil layers. The alumina layer 208 is deposited overlying the first layer 202 without employing any insulating material having a low temperature resistance in comparison to alumina. For example, photoresist or oxide layers have a thermal conductivity that is substantially lower than the thermal conductivity of alumina, a low thermal conductivity that is insufficiently heat resistance for usage with a coil that is employed to heat the lens to evaporate any condensate. The alumina layer 208 operates as a thermal conductor for removing heat from the magneto-optical flying head 102, thereby reducing deterioration of the magneto-optical flying head 102 due to heating.

Usage of the alumina layer 208 as an insulator between coil layers is further advantageous since the coils are spaced more closely and the magnetic coil 108 is positioned nearer to the upper surface of the magneto-optical flying head 102, thereby attaining increased efficiency and better magnetic performance. In the illustrative near-field magneto-optical recording system 100, individual coil layers are spaced approximately 1 micron apart following planarization.

The alumina layer 208, upon deposition, forms a very uneven structure with large bumps overlying the individual coils. Additional coil layers that are subsequently deposited are to be formed on a highly level structure to a tolerance of tenths or hundredths of a micron. Planarization is used to level the bumps. The DLC protective layer 206 is a highly effective mask for protecting the mesa 226 during the planarization procedure.

Figure 2F:
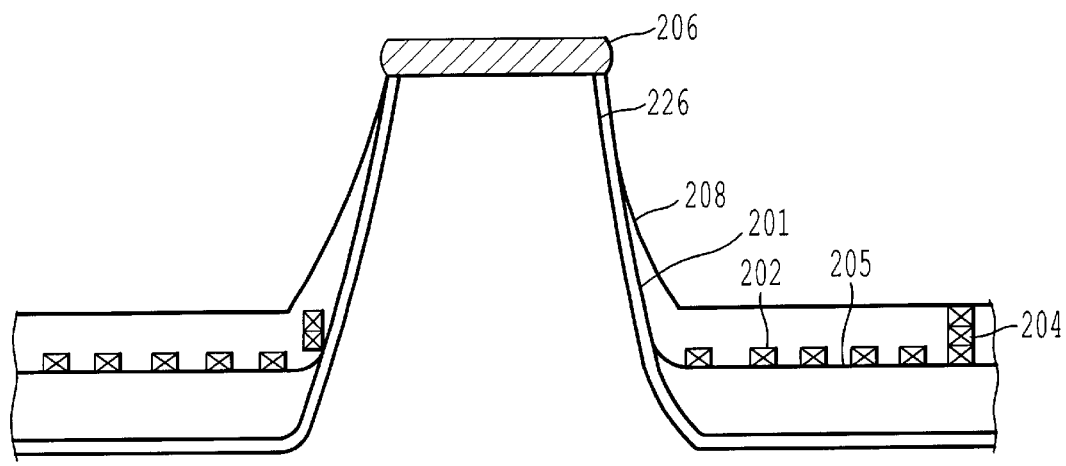

Referring to FIG. 2(F), the surface of the magneto-optical flying head 102 is planarized using a chemical-mechanical contouring (CMC) procedure that smoothes the surface to a highly uniform, planar structure. Chemical-mechanical contouring (CMC) utilizes application of polishing pad in a typically orbital or planetary motion to a stationary thin film substrate. The orbital or planetary motion is applied to the thin film substrate by a lapping surface of the polishing pad to planarize a plurality of structures on a substrate, typically as an intermediate step in thin film processing so that, as layers of a thin film magnetic head structure are deposited and etched, successive layers are selectively planarized. The planarization of intermediate layers is performed to ready the thin film surface for subsequent layer depositions.

CMC processing further involves application of a chemical slurry to the polishing pad and the thin film substrate workpiece to generate a chemical etching while the workpiece is mechanically contoured. The slurry is a mixture of a chemical etchant and an abrasive compound. As a slurry and polishing motion of the polishing pad are applied to the thin film substrate workpiece, the workpiece is lapped by a lapping surface of the polishing pad.

FIG. 2(F) shows the magneto-optical flying head 102 following planarization to form a polished, very flat surface from a very rough, corrugate surface. The alumina layer 208 is planarized to a planar structure so that a second coil layer is positioned very close to the first layer 202 and the individual coil elements are uniformly spaced in the vertical dimension. The chemical-mechanical contouring forms a highly uniform, planar and compact structure for multiple coil layers.

Figure 2G:
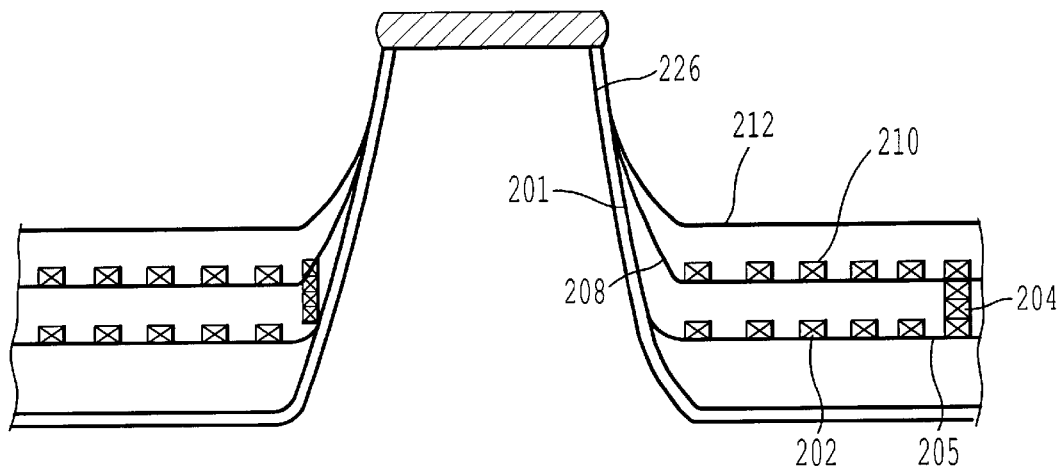

Referring to FIG. 2(G), a second coil layer 210 is formed overlying the first alumina layer 208. Typically two or more coil layers are utilized to attain a sufficient magnetic for writing the substrate media 110. A single coil layer may be used to attain a sufficient magnetic field but may result in too large an inductance. Multiple coil layers advantageously reduce inductance and increase efficiency.

A second alumina layer 212 is deposited overlying the second coil layer 210 and planarized so that the coils extend as close to the top of the mesa 226 as possible. The DLC protective layer 206 also protects the mesa 226 during the second planarization step.

Figure 2H:
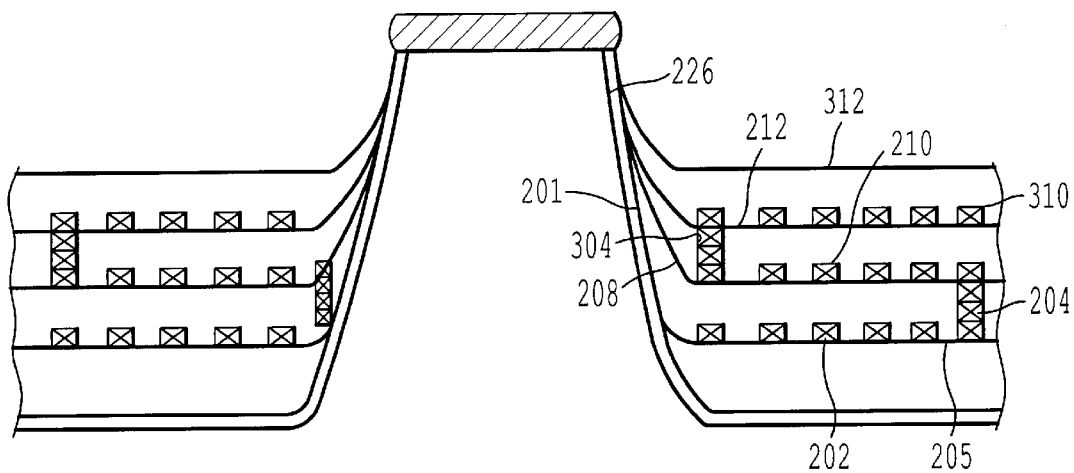
FIG. 2(H) shows an alternative embodiment of a magneto-optical flying head and solid immersion lens, an embodiment that includes an additional (third) coil layer 310, via 304, and additional (third) alumina layer 312.

Although two magnetic coil layers are depicted in the illustrative embodiment of FIG. 2(G), additional coil layers may be utilized in other embodiments. For example, FIG. 2(H) shows an alternative embodiment of a magneto-optical flying head and solid immersion lens, an embodiment that includes an additional (third) coil layer 310, via 304, and additional (third) alumina layer 312. The three-layer embodiment of FIG. 2(H) may be constructed in accordance with the principles and procedures outlined above, with reference to the FIG. 2(G) embodiment.

While the invention has been described with reference to various embodiments, it will be understood that these embodiments are illustrative and the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

What is claimed is:

1. A magneto-optical head comprising:
    a substrate perforated by a hole;
    a mesa formed within the hole in the substrate of a material having a high refractory index;
    a first coil arranged on the substrate in a first coil layer, the first coil coiled around the mesa at an increasing radius about the mesa;
    a first high thermal conductivity insulating layer deposited over the substrate around, between, and overlying the first coil with no intervening material having a relatively low thermal conductivity separating the first high thermal conductivity insulating layer and the first coil, the first high thermal conductivity insulating layer having a planar surface;
    a second coil arranged on the first high thermal conductivity insulating layer in a second coil layer, the second coil coiled around the mesa at an increasing radius about the mesa;
    a second high thermal conductivity insulating layer deposited over the first high thermal conductivity insulating layer around, between, and overlying the second coil with no intervening material having a relatively low thermal conductivity separating the second high thermal conductivity insulating layer and the second coil, the second high thermal conductivity insulating layer having a planar surface; and
    a via passing through the first high thermal conductivity insulating layer and coupling the first coil and the second coil to form a continuous coil in the first and second coil layers.

2. A magneto-optical head according to claim 1 further comprising:
    at least one additional coil arranged overlying the second high thermal conductivity insulating layer in at least one additional coil layer, the at least one additional coil coiled around the mesa at an increasing radius about the mesa;
    at least one additional high thermal conductivity insulating layer deposited overlying the second high thermal conductivity insulating layer around, between, and overlying the at least one additional coil with no intervening material having a relatively low thermal conductivity separating the at least one additional high thermal conductivity insulating layer and the at least one additional coil, the at least one additional high thermal conductivity insulating layer having a planar surface; and a via passing through the second high thermal conductivity insulating layer or the at least one additional high thermal conductivity insulating layer and coupling the at least one additional coil to the immediately underlying coil to form a continuous coil in the first, second, and at least one additional coil layers.

3. A magneto-optical head according to claim 2 further comprising:

a conductive heating element layer coupled encircling and adhered to lateral sides of the mesa, and having lead appendages extending from the lateral sides of the mesa overlying the substrate and underlying the first coil layer; and an insulative layer coupled between the conductive heating element layer and the first coil layer, the insulative layer having a thermal conductivity substantially lower than the thermal conductivity of the material forming the first, second, and at least one additional high thermal conductivity insulating layers.

4. A magneto-optical head according to claim 2 wherein:

the material forming the first, second, and at least one additional high thermal conductivity insulating layers is alumina.

5. A magneto-optical head according to claim 2 further comprising:

a conductive heating element layer coupled encircling and adhered to lateral sides of the mesa, and having lead appendages extending from the lateral sides of the mesa overlying the substrate and underlying the first coil layer, the conductive heating element layer being fabricated from nichrome; and an insulative layer coupled between the conductive heating element layer and the first coil layer, the insulative layer having a thermal conductivity substantially lower than the thermal conductivity of the material forming the first, second, and at least one additional high thermal conductivity insulating layers, wherein:

the insulative layer is fabricated from an oxide material such as silicon dioxide or silicon monoxide, and the first, second, and at least one additional high thermal conductivity layer is fabricated from alumina.

6. A magneto-optical head according to claim 2 wherein:

the first, second, and at least one additional coil are fabricated from a material selected from a group of materials including copper, gold, and tantalum.

7. A magneto-optical head according to claim 1 further comprising:

a conductive heating element layer coupled encircling and adhered to lateral sides of the mesa, and having lead appendages extending from the lateral sides of the mesa overlying the substrate and underlying the first coil layer; and an insulative layer coupled between the conductive heating element layer and the first coil layer.

8. A magneto-optical head according to claim 1 wherein:

the mesa is fabricated from a material selected from a group of materials including cubic zirconia, glass, silicon nitride, and diamond.

9. A magneto-optical head according to claim 1 wherein:

the mesa functions as a solid immersion lens.

10. A near-field magneto-optical recording system comprising:

an optics module including an illumination pathway for passing laser illumination;

an objective lens; and the magneto-optical head according to claim 1.

* * * * *